United States Patent [19]

Nunes

[11] 4,078,276
[45] Mar. 14, 1978

[54] HINGE PIN

[76] Inventor: Anthony M. Nunes, 1401 N. Elk Valley Rd., Crescent City, Calif. 95531

[21] Appl. No.: 708,601

[22] Filed: Jul. 26, 1976

[51] Int. Cl.² .............................................. E05D 7/04
[52] U.S. Cl. ........................................ 16/130; 16/168; 403/161; 403/224; 403/297; 403/409; 403/370
[58] Field of Search .................... 16/128 R, 168, 169, 16/130, 178; 403/163, 370, 371, 409, 297; 308/23 RR, 23 RA, 70, 69

[56] References Cited

U.S. PATENT DOCUMENTS

| 374,833 | 12/1887 | Hill .................................... 308/237 R |
| 741,563 | 10/1903 | Stevens et al. ........................... 85/79 |
| 3,342,097 | 9/1967 | Rocheleau ............................... 85/79 |
| 3,841,771 | 10/1974 | Shankwitz et al. .................. 403/163 |

*Primary Examiner*—Wayne L. Shedd
*Attorney, Agent, or Firm*—Kolisch, Hartwell, Dickinson & Stuart

[57] ABSTRACT

A hinge pin including two substantially identical sections which when assembled form a cylindrical sleeve. Each section has a first end having a cross-section greater than a semi-circle which tapers along its length to a second end having a cross-section less than a semi-circle. When the two sections are joined together, they form a cylindrical sleeve for use as a readily removable hinge pin. Ready removal is effectuated by sliding one section away from the other along their tapered lengths, the taper enabling the average diameter of the sleeve to decrease as the two sections are so slid apart.

4 Claims, 4 Drawing Figures

U.S. Patent                March 14, 1978                4,078,276
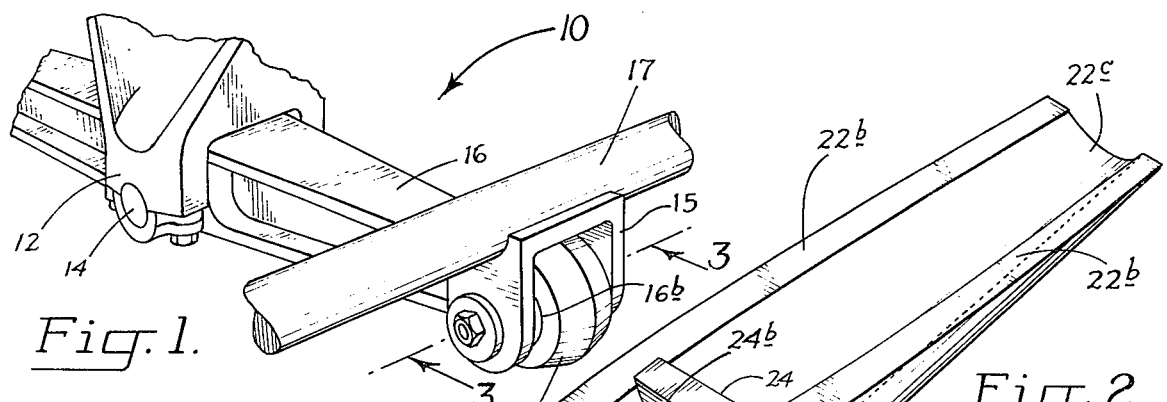
Fig. 1.
Fig. 2.
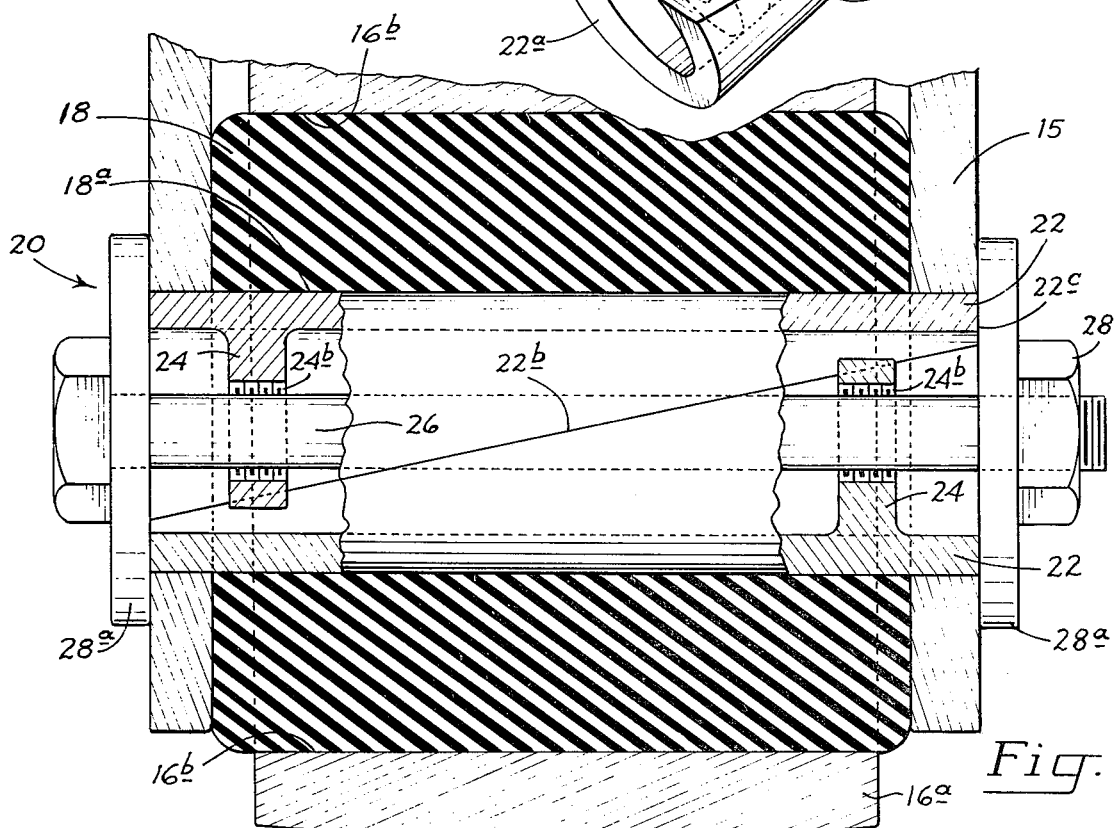
Fig. 3.
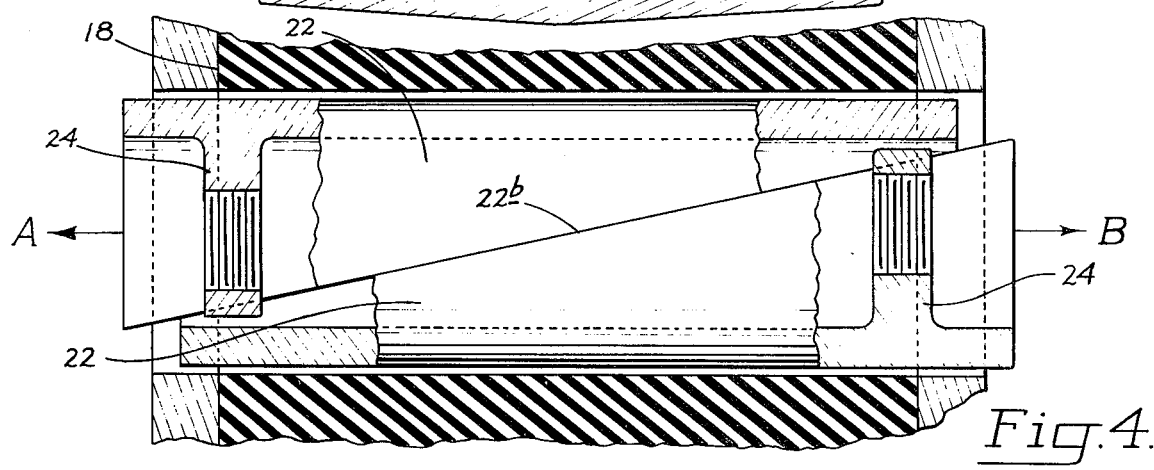
Fig. 4.

HINGE PIN

BACKGROUND OF THE INVENTION

The present invention relates to hinge pins used as bushings to pivotally connect two members together, and more particularly to a novel two-piece hinge pin which, when assembled, defines a cylindrical sleeve. The cylindrical sleeve includes two sections which are slidable with respect to each other so that the pin may be readily removed from within a rubber mounting.

In heavily loaded vehicles, it is known to provide walking beams which are pivotally-connected to U-shaped axle brackets. An axle is situated on top of the bracket. Because of the heavy loading, a cylindrical sleeve serving as a hinge pin is disposed within a rubber mount which in turn is fitted within a bore of the walking beam. The cylindrical sleeve serves as a hinge pin connecting the axle bracket to the walking beam. A bolt is inserted through the pin and includes washers at the ends in order to keep the sleeve from working its way free.

A problem resulting from the above construction resides in the fact that the cylindrical sleeve may become damaged or scored due to heat and the heavy loading. Such distortion requires that the entire bushing be periodically replaced, a task somewhat difficult and burdensome as well as time consuming because the inner cylindrical sleeve may not be readily removable because of its distorted condition. Consequently, in order to remove such a sleeve, it is necessary that they be secured to a wheel puller or be physically knocked out of engagement with the outer resilient bushing.

Prior art hinge pin bushings generally take the form of an outer cylindrical rubber sleeve which is inserted in a circular bore in a member to be pivotally connected to another member. Circumferentially disposed within the inner diameter of the rubber sleeve is a cylindrical metal sleeve which serves as a bearing surface for a bolt interconnecting the two members together. It has been proposed to taper a hinge pin so that it has a generally cup-shaped collar movable into a wedged position in a surrounding bore as disclosed in U.S. Pat. No. 3,841,771. A larger bolt may then be advanced to move a collar out of wedged engagement for facilitating removal. However, while removal from a collar may be facilitated, there is no provision for the ready removal of the inner metal sleeve of a bushing from the main bore through which the bushing is inserted.

In U.S. Pat. No. 3,600,789, there is disclosed an anchor which has a conical or tapered cross-section employed as a wedge within a tubular outer member for securing a drive bolt within a wall. If the anchor is displaced outwardly, it would slide readily from the tubular member if the bolt were removed because of the tapered feature of the anchor. However, such a construction does not appear to be applicable for use as a cylindrical metal sleeve within a rubber mounting.

While not directly applicable to bushings or bearings, U.S. Pat. No. 647,020 disposes an adjustable key having two tapering parts which are used to compensate for the lengthening or shortening of a piston rod within a cylinder. While the adjustable key has tapering portions, it is to be noted that the key is solid and could not be readily adapted for use as a sleeve member.

SUMMARY OF THE INVENTION

The present invention includes two members assemblable to form a cylindrical sleeve for use as a hinge pin or sleeve within a resilient mounting to pivotally secure two members together. Specifically, the hinge pin of the present invention includes two sections, each substantially identical to the other and each having a first end having a cross-section greater than a semi-circle which tapers to a second end having a cross-section less than a semi-circle. When the two sections are situated together, they form a cylindrical sleeve.

It is a general object of the present invention to provide a two-piece cylindrical sleeve for use as a hinge pin in pivotally connecting two members together such that the pin sections may be readily removed by moving one of the tapered sections with respect to the other tapered section such that the sections slide along their respective tapers. Such sliding will decrease the average diameter existing between the two sections to thereby permit ready removal of the sections from a bore having a predetermined cross section.

Another object of the present invention is to provide a two-piece hinge pin which includes a plate secured interiorly within the section for connection to a wheel puller so that the sections may be slid with respect to each other with the aid of a mechanical force.

Yet another object of the present invention is to provide a readily removable two-piece hinge pin formed as an assembled cylindrical sleeve insertable within a resilient mounting for providing a bushing assembly which is adapted to receive a securing bolt therethrough.

Additional objects of the present invention reside in the specific construction of the exemplary device hereinafter particularly described in the specification and shown in the drawing.

BRIEF DESCRIPTION OF THE DRAWINGS

Novel features of the improved hinge pin in accordance with the present invention will be more readily understood from a consideration of the following description taken together with the accompanying drawing, in which a preferred embodiment is illustrated with the various parts thereof identified by suitable reference characters in each of the views, and in which:

FIG. 1 is a perspective view of a portion of a walking beam, axle bracket and axle utilizing the hinge pin of the present invention;

FIG. 2 is a perspective view of one of the halves or sections of the hinge pin of the present invention;

FIG. 3 is a sectional view taken along lines 3—3 of FIG. 1 and illustrates the hinge pin of the present invention in assembled position for pivotally connecting the axle bracket to the walking beam;

FIG. 4 is a view similar to FIG. 3 illustrating how the hinge pin halves or sections may be moved longitudinally with respect to each other to permit ready removal of the hinge pin.

DETAILED DESCRIPTION OF THE INVENTION

Turning now to the drawings, and referring initially to FIG. 1, a portion of a suspension system of a vehicle is indicated generally at 10. The suspension system 10 includes a bracket 12 having a connection 14 for pivotally mounting a walking beam 16. The walking beam 16 includes an enlarged end 16a having a bore 16b. As shown in FIG. 3 a sleeve 18 of resilient material is disposed within bore 16b. In accordance with the present invention, a two-piece hinge pin, generally designated at 20, is inserted within a bore 18a of the resilient member 18 for pivotally connecting the axle bracket 15 and the walking beam 16. Bracket 15 is shown carrying a conventional axle 17.

With reference directed now to FIG. 2, one of the halves or sections of the hinge pin 20 is illustrated. Each of the sections 22 is substantially identical and includes a first end 22a having a cross-section somewhat larger than a semi-circle which tapers along split line faces 22b to a second end 22c having a cross-section somewhat less than a semi-circle. A plate 24 is mounted interiorly of the section 22 and includes an aperture 24b having threads.

With the sections 22 assembled as shown in FIG. 3, an elongate bolt 26 is non-engageably inserted through the threaded apertures 24b and is secured by means of a nut 28 and washer 28a so that the walking beam 16 may be pivoted with respect to the axle bracket 15 without the hinge pin 20 becoming dislodged. The bolt 26 is constructed with a diameter somewhat less than the threaded aperture 24b so that the bolt may be readily inserted therethrough.

When it is desired to remove the hinge pin 20, the nut 28 is loosened so that the bolt 26 and the washers 28a may be removed. The hinge pin sections 22 may be slidably separated from one another along the tapered split lines 22b in the direction of either arrows A or B so that the average diameter between the pin sections 22 decreases as the sections are moved further apart. As shown in FIG. 4, the pin sections 22 have been displaced an amount such that the pin halves 22 will not substantially engage the rubber mount 18. It can be readily appreciated that the hinge pin sections 22 may now be readily removed. In the case where the hinge pin 20 is badly scored or damaged, a wheel puller may be required in order to effectuate removal. Accordingly, such a wheel puller (not shown) may be secured to one or both of the mounts 24 and actuated to pull one or both of the pin halves 22 with respect to the other as shown in FIG. 4.

It can be readily appreciated that the present invention provides a hinge pin constructed so that it may be readily removed. However, it is to be additionally noted that the pin sections 22 could also be assembled so that they are wedged tightly together. For instance, if the sections 22 are inserted within the bore 18a and slid upon each other in directions opposite to the arrows A and B, eventually the sections 22 will be tightly wedged together against the bore 18a.

While the invention has been particularly shown and described with reference to the foregoing preferred embodiment thereof, it will be understood by those skilled in the art that other changes in form and detail may be made therein without departing from the spirit and scope as defined in the appended claims.

It is claimed and desired to secure by Letters Patent:

1. A disassemblable hinge pin comprising:
    two substantially identical sections defining a cylindrical sleeve when assembled, each section tapering over its length from a first end having a cross-section greater than a semi-circle to a second end having a cross-section smaller than a semi-circle,
    at least one of said sections including means mounted interiorly thereof for engaging a wheel puller or the like.

2. The hinge pin of claim 1 wherein said engaging means includes a plate having an aperture extending therethrough.

3. The hinge pin of claim 2 wherein said plate is provided with a threaded aperture.

4. A disassemblable hinge pin for interconnecting an axle bracket to a walking beam by insertion of the hinge pin through concentric apertures in the bracket and walking beam, said hinge pin comprising:
    two substantially identical sections which together define a generally cylindrical sleeve, each of said sections being longitudinally tapered from a first end having a cross-section greater than a semi-circle to a second end having a cross-section less than a semi-circle, said sections being slidable along each other so that the average cross-sectional area of the sleeve decreases as said sections are slidably moved apart, thereby facilitating removal of said sections from interconnecting the axle bracket and walking beam, at least one of said sections including a threaded, apertured plate mounted interiorly thereof for operative interengagement with the threads on a wheel puller or the like.

* * * * *

UNITED STATES PATENT AND TRADEMARK OFFICE
CERTIFICATE OF CORRECTION

PATENT NO. : 4,078,276
DATED : March 14, 1978
INVENTOR(S) : Anthony M. Nunes

It is certified that error appears in the above—identified patent and that said Letters Patent are hereby corrected as shown below:

In the Abstract, line 1, after "two" insert —,—;

In column 3, line 15, after "threads." insert —Plate 24 with threaded aperture 24b provides a means for engaging a wheel puller or the like which may be used to facilitate removal of the sections 22 relative to each other.—

Signed and Sealed this

Twenty-fourth Day of October 1978

[SEAL]

Attest:

RUTH C. MASON
Attesting Officer

DONALD W. BANNER
Commissioner of Patents and Trademarks